June 21, 1927.                      1,633,159
H. N. ATWOOD
VEHICLE BODY
Filed Aug. 23, 1923

Inventor
Harry N. Atwood.

By Lacy & Lacy, Attorneys

Patented June 21, 1927.

1,633,159

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

VEHICLE BODY.

Application filed August 23, 1923. Serial No. 658,948.

This invention relates to improvements in the construction of automobile bodies and the invention contemplates the manufacture of all types of automobile bodies from a material prepared and built up in a manner to overcome the many disadvantages presented by the materials which have up to this time been employed for this purpose.

The present invention has as its object to provide an automobile body which will possess a desirable degree of resiliency, flexibility, yieldability, and elasticity, so that the stresses and strains to which the body will be subjected, will be in great part absorbed or minimized, and thus prevented from causing annoyance to the occupants of the vehicle under traveling conditions and likewise prevented from being communicated to the more delicate mechanism of the vehicle.

Another important object of the present invention is to provide a vehicle body which may be manufactured from a material of such character that the body may be made substantially integral or of one-piece structure throughout, whether it be intended for touring, or for the closed type of cars, thereby obtaining all of the advantages which should be present in a solid one-piece body as distinguished from a body comprising component parts secured together by mechanical means, and at the same time overcoming the disadvantages which would be presented by a cast one-piece body made from metal.

The present invention has as a further important object to provide a body constructed of such material that it will be practically non-resonant and non-sound conducting and will in fact absorb instead of reverberating the various vibrations and impulses generated in its vicinity.

The invention has as a further important object to provide a body constructed of a material which will be not only of a heat-insulating character but also a non-conductor of electricity.

The invention has as a still further object to employ a material in the construction of automobile bodies which will be water-proof in character and capable of resisting the deteriorating action of the elements, as well as being less liable to marring and at the same time capable of being more readily finished, and at a lower cost than bodies of metal having enameled surfaces.

Figure 1:
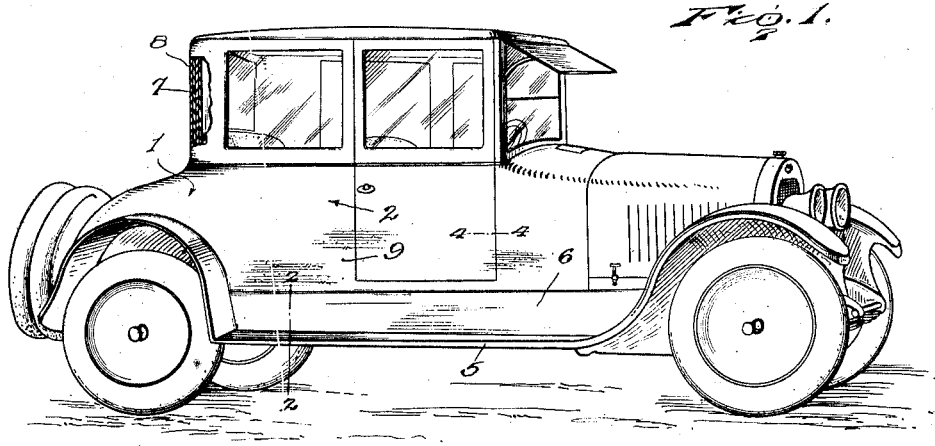
Figure 1 is a side elevation of an automobile, the body of which is constructed in accordance with the present invention, a portion of the body being broken away and a portion shown in section illustrating the principles of the invention.

In the drawings, the automobile body is indicated in general by the numeral 1 and the same comprises such component portions as are ordinarily found in structures of this class. A portion of the structure shown in the drawings and designated by the numeral 2, represents a portion of one side of the vehicle body and another portion, designated by the numeral 3, represents the bottom or floor of the body, the chassis frame being indicated by the numeral 4, and one of the running boards by the numeral 5, the running board guard being indicated by the numeral 6. These latter parts may be of the ordinary materials and constructed in the usual manner, or if desired the running board 5 may be constructed of the same material as the body and in accordance with the present invention, as may also the running board guard 6.

The body, or so much of it as is constructed in accordance with the invention, is made up of a number of plies of body material which are indicated by the numeral 7, bonding plies 8, and facing and lining plies indicated respectively by the numerals 9 and 10. The plies 7 are preferably of wood veneer. I have found wood veneer to be an ideal material for this purpose as it possesses all of the qualities enumerated above and, in addition, is inexpensive to produce and economical to work and finish. The plies 8 are of rubber, rubberized fabric, or other rubber material and initially are in an uncured or semi-cured state. The facing and lining plies 9 and 10 are likewise of rubber material and also are initially in an uncured or semi-cured state. In carrying out the invention, the body plies, and the bonding and facing and lining plies are cut to the required marginal outline and dimensions, and the said body plies are shaped by molding or otherwise to approximately the form which it will be required they shall assume in the finished structure and depending of course upon their location in the structure. The bonding, facing, and lining plies, being of a flexible material which is more or less limp, do not require to be previously shaped to the contour to which they will finally assume. Having prepared the several plies, they are assembled by interposing the bonding plies between adjacent ones of the body plies, and applying the facing and lining plies respectively to the outer and inner sides of the walls of the structure. The entire structure is then arranged within a suitable mold chamber and while in this chamber is subjected to the action of pressure and, preferably the latter in the form of steam under pressure, and during this process, the entire assemblage of plies will be intimately bonded into a composite whole, the plies having a rubber content being vulcanized during the process and, during the process of vulcanization, becoming intimately incorporated with and bonded to the plies of body material. Therefore, the finished structure will comprise practically an integral composite whole as distinguished from a structure which is built up in sections connected together by mechanical securing means or a structure comprising plies of material superficially united by cement or the like.

Figure 3:
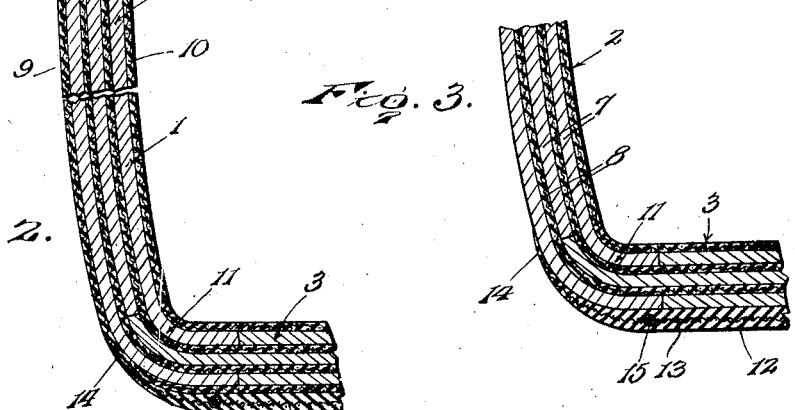
Figure 3 is a similar view illustrating a modification of the invention.
Figure 2:
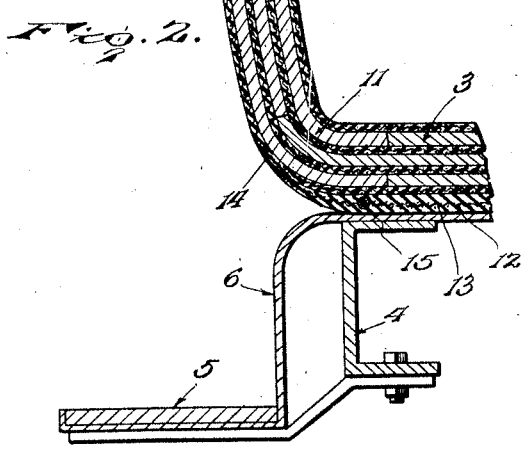
Figure 2 is a vertical transverse sectional view on the line 2—2 of Figure 1.

As heretofore indicated, seams and joints are avoided throughout the structure. That is to say, in building up the structure I avoid forming any seams or joints which will weaken the structure or which will require the employment of extraneous mechanical fastening means such as bolts, rivets, screws, brackets, clamps, or the like, for closing the seams or joints. As it would be impractical to form the body plies 7 integral throughout the entire body, provision must be made for proper and substantial union of the plies at their marginal portions. In Figures 2 and 3 of the drawings, for example, it will be observed that where the lower portion of the side wall 2 meets the floor or bottom 3 of the body, the two portions of the body are connected on a more or less acutely curved line as indicated by the numeral 11. At this point it is convenient to join the meeting marginal portions of the several plies and, as an example, certain of the body plies of the side or of the bottom, or of both, may project beyond the margins of associated ones of the body plies. The bonding plies are similarly arranged at their marginal portions, and, if desired, the facing and lining plies may likewise be so arranged. As a result of this arrangement, when the side and bottom or floor of the body structure are brought together at the time of assemblage, the projecting marginal portions of the plies of the two assemblages may be interleaved so that where the edges of the plies meet, this line of juncture will not coincide with the line of juncture of adjacent plies, the several lines of juncture throughout the entire assemblage breaking joint or being staggered with respect to one another. This produces a joint which is equally as substantial as the structure at a point more remote from the joints, and in the process of vulcanization heretofore outlined, the interleaved portions of the plies of the several associated assemblages will be so intimately bonded together that substantially a unitary and integral structure will be produced, it being wholly unnecessary to employ any bolts or other fastening elements for the purpose of securing the assemblages together at the joints. It will be understood, of course, that the idea of interleaving the plies of adjacent assemblages may be carried further by even more widely spacing the lines of juncture of the margins of adjacent plies. That is to say, it is not necessary nor will it, in all probability, always be desirable to locate the various lines of juncture between the plies in such close proximity as is illustrated in Figures 2 and 3.

If found desirable, the bonding plies 8 may have wire mesh gauze embedded in the rubber content thereof, this structure being embraced within the meaning of the expression "rubberized fabric" hereinbefore employed.

The body constructed in accordance with the foregoing description is designed to be mounted upon the chassis frame and secured thereon by the customary appliances. In this case, however, as distinguished from the ordinary structures heretofore used, there is no metal to metal contact and ordinarily there will be no wood to metal contact between the parts. In fact it is preferable that the under side of the bottom or floor 3 be provided with a supplemental facing ply 12 of rubber material similar to the main facing ply 9 and of a suitable thickness so that when the body is disposed and secured upon the chassis frame, its connection with the frame will be cushioned at all points of contact thereby not only enhancing the flexibility of the machine as a whole but also eliminating or deadening the sounds which would otherwise be noticeable if there were a metal to metal or wood to metal contact between the parts. If desired, the facing ply may be increased in thickness where it covers the under surface of the bottom or floor 3 of the structure, instead of employing a separate and distinct auxiliary ply such as the ply 12.

In the embodiment of the invention just described, the facing ply 9 covers the entire exterior surface of the body, and this ply, being of rubber material, may be finished and its exposed surface molded or embossed in any desired manner to produce an ornamental or neat appearance. A body so finished will not be liable to be marred or defaced by ordinary usage, and it will be entirely water-proof. However, if desired, the body may be given a wood finish and where this is found desirable the body will be built up in the manner illustrated in Figure 3 of the drawings. In this embodiment of the invention one of the body plies 7 is left exposed at the exterior of the body, the facing ply 9 of the previously described form being omitted. Consequently, the surface of this exposed body ply may be varnished, stained, and finished in various ways to produce the desired and most pleasing effects. In this case it will be desirable as in the first described form, to cushion the contact of the body with the chassis frame, and for this purpose a facing and cushioning ply 13 of rubber material corresponding to the auxiliary ply 12 may be applied to the under side of the bottom or floor 3 of the structure and it will no doubt be preferable to gradually thin the marginal portion of the said ply 13 as indicated by the numeral 14 until it finally merges directly with the exterior or exposed surface of the outermost body ply of the structure.

It will be understood, of course, that door and window openings and in fact all necessary openings in the walls or bottom of the body structure may be readily provided.

As illustrated in the drawings, one or more electrical conductor wires 15 may be embedded in the facing plies of the structure or in the lining plies, or in fact in the intervening bonding plies if the latter should be found desirable. As these plies are of rubber material, wires embedded therein will be effectually protected from electrical contact with metallic or other conducting parts and also protected from breakage and from the accumulation of moisture. Also in this manner the wires may be concealed from view and in fact the entire wiring system of the automobile may be embedded in one or more of the plies of rubber material.

An automobile body constructed in accordance with the invention will be noiseless, proof against disintegration, water-proof, flexible, yieldable, and at the same time possess the requisite degree of strength. Such a body will not require the employment of padding, gaskets, fillings, and other means to cushion or silence the same, and the structure, furthermore, can be installed directly on the most rigid or the most flexible chassis frame without detriment to its integrity. The structure is furthermore heat and electrically insulating and is also non-resonant so that it will not conduct nor will it reverberate sounds. Furthermore, such a body will not be liable to crack, warp, become distorted, absorb moisture, or decay or disintegrate because of climatic changes.

Figure 4:
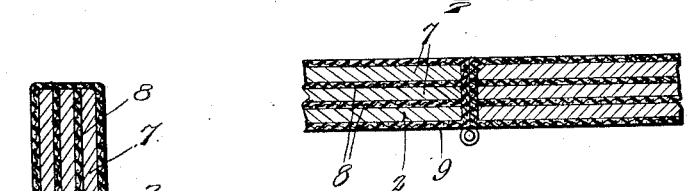
Figure 4 is a detail horizontal sectional view substantially on the line 4—4 of Figure 1.

By reference to Figure 4 of the drawings it will be observed that the facing and lining plies of the structure are to be led over the bounding walls of the door openings and likewise over the bounding edges of doors so that as a consequence, when the doors are closed, the plies, being of rubber material, will mutually contact and be sufficiently compressed to maintain the door tight and prevent rattling.

Having thus described the invention, what is claimed as new is:

1. A vehicle body comprising an integral structure of body plies of wood and intervening bonding plies of rubber material, the body having a facing upon its exterior of rubber material, the facing extending onto the under side of the bottom of the body and entirely covering the same and providing a cushioning medium between the said bottom of the body and the frame structure upon which the body is to be supported.

2. A vehicle body comprising an assemblage of plies of wood and continuous plies of rubber bonding material, the wood plies at the lines of juncture of their marginal portions with each other being spanned by the bonding plies, and a facing ply of rubber material extending continuously over the outer surface of the assemblage.

3. A vehicle body comprising an integral vulcanized assemblage of wood plies and rubber bonding plies, and a ply of cushioning rubber material entirely covering the under side of the bottom of the body for contact with the chassis frame upon which the body is to be mounted.

4. A vehicle body comprising an integral vulcanized assemblage of wood plies and rubber bonding plies, and a ply of cushioning rubber material entirely covering the under side of the bottom of the body for contact with the chassis frame upon which the body is to be mounted, the said cushioning ply being of greater thickness than the other rubber plies and decreased in thickness where it is merged with the side surfaces of the body.

5. A vehicle body having its wall integrally formed and comprising body plies of a material possessing a limited degree of flexibility and resiliency, and plies of cushioning bonding material uniting the first mentioned plies, the said wall being formed with a door opening, a door mounted in the opening and of the same composition as the said wall, and facing plies covering the said wall and the surface of the door and extending over the side edges of the door opening and over the side edges of the door.

6. In a vehicle body, a laminated wall section comprising plies of wood each having an outline and contour corresponding to the wall section, and plies of rubber disposed between the wood plies and against the outer faces and marginal edges thereof and vulcanized into intimate engagement with the wood plies and each other to form a wall having cushioning surfaces and marginal edge faces.

In testimony whereof I affix my signature.

HARRY N. ATWOOD.